United States Patent
Ghera et al.

(10) Patent No.: US 7,440,177 B2
(45) Date of Patent: Oct. 21, 2008

(54) METHOD AND SYSTEM FOR IMPROVED EYE PROTECTION SAFETY OF HIGH OUTPUT POWER LUMPED OPTICAL AMPLIFIERS

(75) Inventors: Uri Ghera, Tel Aviv (IL); Alex Shlifer, Rehovot (IL); David Menashe, Tel Aviv (IL)

(73) Assignee: EDC Optical Networks Inc., Tel-Aviv (IL)

( * ) Notice: Subject to any disclaimer, the term of this patent is extended or adjusted under 35 U.S.C. 154(b) by 0 days.

(21) Appl. No.: 11/692,970

(22) Filed: Mar. 29, 2007

(65) Prior Publication Data

US 2007/0177254 A1 Aug. 2, 2007

Related U.S. Application Data

(60) Continuation-in-part of application No. 11/464,198, filed on Aug. 13, 2006, now Pat. No. 7,283,292, which is a division of application No. 11/001,055, filed on Dec. 2, 2004, now Pat. No. 7,116,471.

(51) Int. Cl.
*H01S 4/00* (2006.01)
*H04B 10/12* (2006.01)

(52) U.S. Cl. .................... 359/341.44; 359/334

(58) Field of Classification Search .......... 359/334, 359/341.44
See application file for complete search history.

(56) References Cited

U.S. PATENT DOCUMENTS

| | | | |
|---|---|---|---|
| 6,344,915 B1 * | 2/2002 | Alexander et al. | 398/115 |
| 6,433,922 B1 * | 8/2002 | Ghera et al. | 359/334 |
| 6,532,102 B2 * | 3/2003 | Kobayashi et al. | 359/334 |
| 6,683,712 B2 * | 1/2004 | Tanaka et al. | 359/341.3 |
| 2004/0090663 A1 * | 5/2004 | Kamada et al. | 359/334 |
| 2005/0024712 A1 * | 2/2005 | Hiraizumi et al. | 359/334 |
| 2005/0213196 A1 * | 9/2005 | Ishikawa et al. | 359/334 |

* cited by examiner

*Primary Examiner*—Eric Bolda
(74) *Attorney, Agent, or Firm*—Mark M. Friedman

(57) ABSTRACT

A system and method for providing eye-safety protection during operation of a lumped optical amplifier. The method is based on monitoring of continuous out-of-band Raman amplified spontaneous scattering (ASS) created by the amplified signal in an optical communication network span coupled to an output port of the lumped optical amplifier. The system includes at least one gain stage for providing an amplified signal introduced into the span, a monitoring unit for performing the continuous Raman ASS monitoring, and a control unit operative to detect and analyze in real-time changes in the ASS power, and upon determination that such changes indicate an open span, to reduce the power of the amplified signal or shut down the gain stage.

20 Claims, 12 Drawing Sheets

METHOD AND SYSTEM FOR IMPROVED EYE PROTECTION SAFETY OF HIGH OUTPUT POWER LUMPED OPTICAL AMPLIFIERS

CROSS REFERENCE TO RELATED APPLICATIONS

The present application is a continuation in part application of U.S. patent application Ser. No. 11/464,198, filed 13 Aug. 2006 now U.S. Pat. No. 7,283,292, which is a divisional application of U.S. patent application Ser. No. 11/001,055, filed 2 Dec. 2004, now U.S. Pat. No. 7,116,471 issued 3 Oct. 2006, all of which are hereby incorporated herein by reference.

FIELD OF THE INVENTION

The present invention relates generally to optical amplifiers used in fiber optics telecommunications systems. More particularly, the invention relates to high output power lumped optical amplifiers, and to methods and apparatuses for detecting and diagnosing faults in an optical communication system span that utilizes such amplifiers, in order to provide improved eye protection safety.

BACKGROUND OF THE INVENTION

Modem optical communication systems utilize optical amplifiers to amplify wavelength division multiplexed (WDM) signal channels as they are transmitted through the system. One can differentiate between two types of amplifiers commonly used in such systems:

1. Lumped amplifiers, which are self-contained units placed at certain points along the transmission link, with the signal amplification occurring wholly within the amplifier itself. The most common example of such a lumped amplifier is the Erbium doped fiber amplifier (EDFA), which contains a special Erbium doped fiber (EDF). The EDF serves as a gain medium used to transfer energy from laser diode pumps within the amplifier to the optical signal channels as they pass through the amplifier.

2. Distributed Raman amplifiers (DRAs), in which (in contrast with EDFAs) the transmission fiber itself serves as the gain medium, meaning that the signal channels are amplified as they travel through the transmission fiber. In DRAs, the amplification process is distributed along the transmission fiber, as opposed to being lumped in a self-contained unit as in the case of the EDFA. This allows the distance between EDFAs to be increased beyond 120 km, and/or the optical signal to noise ratio (OSNR) of the system to be improved, thus allowing higher bandwidth communication.

FIG. 1 shows an optical communication system employing a lumped optical amplifier as known in the art. The communication system comprises a WDM transmitter 102 which can transmit a WDM signal comprising one or more WDM channels within a specified transmission band (for example, the C-Band, 1525-1565 nm). The transmitted W)M signal propagates along a transmission fiber span 104, being attenuated as it propagates. Lumped optical amplifier 106 re-amplifies the signal, which then continues to propagate along a transmission fiber span 104' until it is received at a WDM receiver 108. The communication system may contain additional transmission fiber spans, as well as additional lumped optical amplifiers placed before or after the spans. In addition the communication system may also employ DRAS.

One major requirement of all optical amplifiers is that they comply with various laser safety standards (such as International Standard, "Safety of Laser Products—Part 1: Equipment Classification, Requirements and User's Guide", IEC 60825-1 and International Standard, "Safety of Laser Products—Part 2: Safety of Optical Fiber Communication Systems", IEC 60825-2). These standards specify a certain limit for safe (so called "class 1M") radiation, such that exposure to such radiation under normal circumstances will not cause eye or skin damage. For example, for radiation in the wavelength region >1400 nm, this limit is about 120 mW (21 dBm). If an amplifier has higher output power, for example in the case of a DRA or a lumped amplifier with high output power, then an automatic shut-down procedure needs to be provided in order to retain a class 1M safety classification. This means that if a disruption occurs in the fiber link (e.g. due to open span) the amplifier will shut-down or reduce output power to a safe level, thus avoiding potential hazard to technicians and equipment. As used herein, the term "open span" refers to the state where there is an open connector, fiber break or cut within the span connected to the output port of an optical amplifier, or any other situation that may cause significant leakage of optical power from the span, thereby posing danger to human eyes coming in contact with the leaked power. The term "opening" is used to refer to the point along the span where the leakage of power occurs. There is clearly a need to immediately and automatically detect any such open span, and shut down the optical amplifier a time span short enough to avoid harm to human eyes (henceforth referred to as "eye-safe time").

The automatic shutdown mechanism should on the one hand be as fail safe as possible, and on the other hand not be activated mistakenly by events that do not pose potential safety hazards. Another desired feature is that the shutdown mechanism be a local and autonomous integrated feature of the amplifier, to further enhance safety and to avoid dependence on other parts of the communication system. Finally, the detection system should ideally provide as much information as possible to the system management with regard to the type of failure (e.g. fiber break or open connector), and its position along the span. This facilitates rapid correction of the failure, and minimization of system downtime.

One method known to the art for providing autonomous and local automatic shut-down of an amplifier is based on monitoring the signal back-reflection that enters the output port of the amplifier. If a connector of type PC (i.e. Polished Connector without an angle) is open down-stream of the output port, then the signal may be strongly back-reflected from this open connector and the strong back-reflection detected upon entering the output port of the amplifier, thus leading to the detection of the open connector. The main problem with this method is that it works only when the open span is due to an open connector of type PC, which causes strong back-reflection. When the open span is due to a fiber break or due to an open connector of type APC (Angle Polished Connector) the back-reflection is small, and will typically be masked by other back-reflections (e.g. Rayleigh scattering, or scattering from splices and closed connectors) normally occurring in the transmission link, thus preventing detection of the open span.

U.S. patent application Ser. No. 11/464,198 discloses a system and method for providing eye-safety protection during operation of distributed Raman amplifiers based on continuous monitoring of out-of-band amplified spontaneous scattering (ASS) created in the transmission span coupled to the Raman amplifier, and real-time detection and analysis of changes in the monitored ASS power level. This method has the advantage that it can detect any type of open span, not just an open span due to a PC connector. The system includes at least one Raman pump for introducing Raman energy into the span, a monitoring unit for performing the continuous ASS monitoring, and a control unit operative to detect and analyze in real-time changes in the ASS power, and upon determination that such changes indicate an open span, to reduce the level of the Raman pump energy entering the span to a safe level.

The method described in U.S. patent application Ser. No. 11/464,198 is naturally suited to distributed Raman amplifiers, since a DRA, by design, outputs high pump power which purpose is to cause Raman amplification in the transmission fiber. The wavelength of each pump and the pump power are controlled by the amplifier itself and typically remains constant. Thus, the level of ASS directed back to the DRA and its decrease due to an open span can be relatively well predicted. In contrast, lumped amplifiers such as EDFAs do not output pump power to the transmission line, but instead output an amplified signal. The spectral composition of the amplified signal is typically not known by the amplifier unit, and more importantly, can change suddenly due to signal Add/Drop events occurring in the optical link. Thus, while the high power amplified signal also generates Raman ASS in the transmission fiber (ASS which is directed back to the amplifier and can be detected), the magnitude and characteristics of this ASS are highly unpredictable and can change suddenly with time unrelated to an open span event.

Accordingly, there is a need for, and it would be advantageous to have a system and method for improved eye protection safety of high power lumped optical amplifiers deployed in networks where dynamic changes such as Add/Drop can occur.

SUMMARY OF THE INVENTION

The present invention discloses an apparatus and method for providing improved safety during operation of a high output power optical amplifier by enabling the detection of an opening in the span connected to the output port of the amplifier, and for performing local and autonomous automatic shut-down upon the occurrence of such an open span event. The detection of the open span is based on continuous monitoring of the Raman ASS directed back to the output port of the amplifier, and created by the amplified signal as it propagates along the span. In the case of lumped optical amplifiers, where the amplifier output constitutes the amplified signal, the wavelength band of the monitored Raman ASS, as well as the calibration of the detection mechanism are tailored to account for the fact that the ASS is created by the amplified signal, which spectral composition may be unknown and unpredictable. Furthermore, allowance is provided for possible sharp changes in the Raman ASS (e.g. due to an Add/Drop event in the transmission link that changes the amplified signal), changes unrelated to an open span event, and which should therefore not cause unnecessary shut-down of the amplifier.

According to the present invention there is provided, in an optical communication system, a lumped optical amplifier for enhancing eye-protection during amplifier including: a gain stage for amplifying an optical transmission signal transmitted in a predetermined wavelength band to create an amplified signal that exits the amplifier through an output port into an optical communication network span, wherein the amplified signal produces out-of-band Raman ASS directed back into the amplifier from the span; a monitoring unit for continuously measuring a power level of the Raman ASS entering the amplifier from the span; and a control unit for reducing the power of the amplified signal or for shutting down the gain stage in response to determination of an opening in the span based on real-time detection of a change in the out-of-band Raman ASS power level.

According to the present invention there is provided in an optical communication system, a lumped optical amplifier for enhancing eye-protection during amplifier operation including: a gain stage for amplifying an optical WDM transmission signal within a predetermined wavelength band to create an amplified signal that exits the amplifier output port into an optical communication network span, wherein the amplified signal produces Raman ASS directed back into the amplifier from the span; an out-of-band Raman ASS monitoring unit for continuously measuring an out-of-band power level of the Raman ASS entering the amplifier from the span; an amplified signal monitoring unit for continuously measuring a power level of the amplified signal; and a control unit for reducing the power of the amplified signal or for shutting down the gain stage in response to determination of an opening in the span based on real-time detection of a change in the out-of-band Raman ASS power level and verification that this change is not associated with a change in the amplified signal level.

According to the present invention there is provided in an optical communication system, a method for enhancing eye-protection during a lumped optical amplifier operation, including the steps of amplifying an input signal of a predetermined wavelength band into an amplified signal transmitted through an output port of the amplifier to a communication network span; continuously monitoring an out-of-band Raman ASS power level related to the amplified signal; detecting in real-time when a change in the out-of-band Raman ASS power level signifies an open span; and, responsive to a result of the detection, reducing the power of the amplified signal or shutting down a gain stage of the amplifier, thereby obtaining enhanced eye-safety.

According to the present invention there is provided in an optical communications system, a method for enhancing eye-protection during a lumped optical amplifier operation including the steps of: obtaining an out-of-band Raman ASS power level related to an amplified signal transmitted through an output port of the amplifier to a communication network span; monitoring the power level of the amplified signal and the out-of-band Raman ASS; determining whether the Raman ASS power level has decreased by more than a value P1 during a preceding time period T1, and if yes; determining whether the amplified signal level has changed by more than a value P2 during a preceding time period T2, and if no; reducing the power of the amplified signal or shutting down a gain stage of the amplifier, thereby obtaining enhanced eye-safety In one embodiment of the method, the step of performing an action to ensure eye-protection includes performing an action selected from the group consisting of shutting down a gain stage of the amplifier and reducing an amplified signal power to a safe level.

BRIEF DESCRIPTION OF THE DRAWINGS

The invention is herein described, by way of example only, with reference to the accompanying drawings, wherein.

DETAILED DESCRIPTION OF THE PREFERRED EMBODIMENTS

Figure 1:
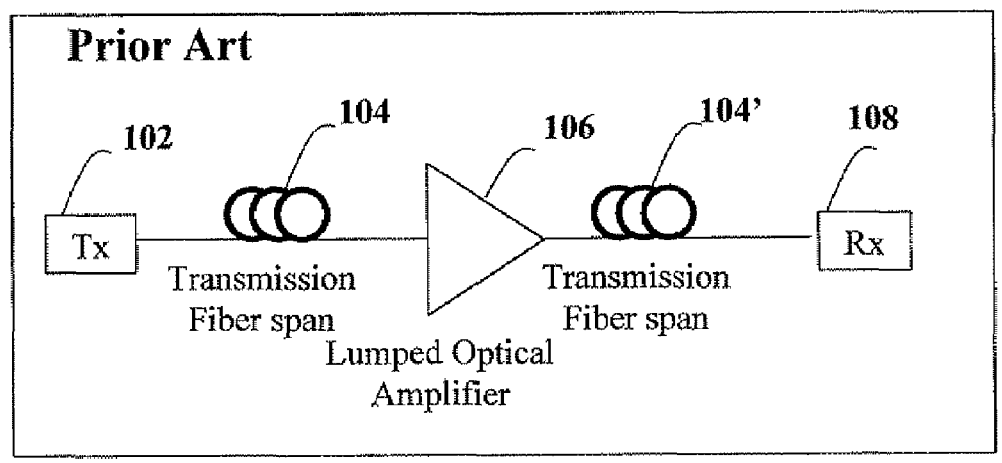
FIG. 1 shows an example of a span of a communication link employing lumped optical amplifiers, as known in prior art.
Figure 2:
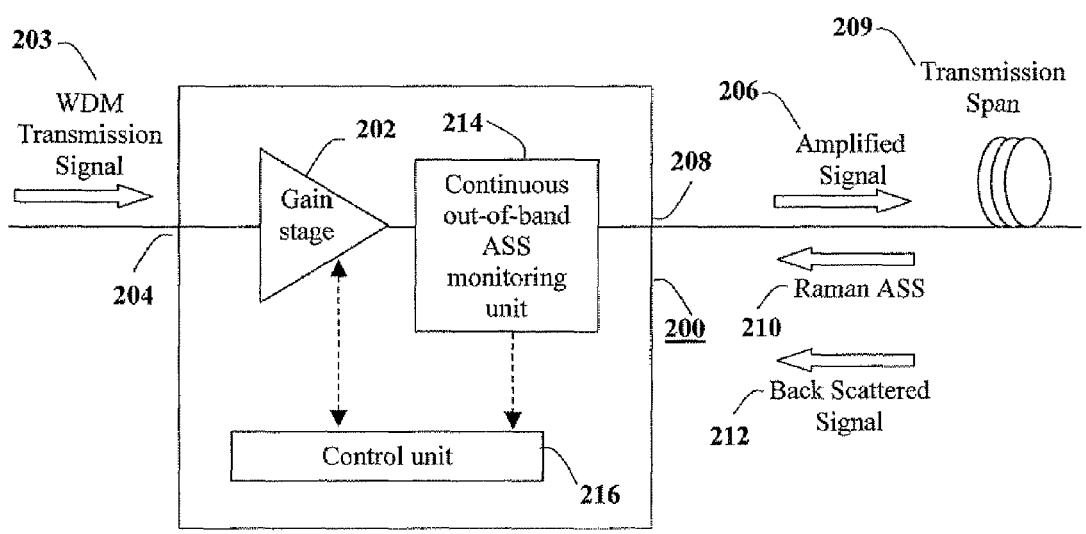
FIG. 2 shows a lumped optical amplifier unit according to a preferred embodiment of the present invention.

FIG. 2 shows a lumped optical amplifier unit (e.g. an EDFA) 200 with an autonomous and local shut-down mechanism according to a preferred embodiment of the present invention. Amplifier unit 200 includes a gain stage 202 designed to amplify a WDM transmission signal 203 entering an input port 204 of the amplifier, creating an amplified signal 206 which exits an output port 208 of the amplifier. The input WDM signal may include one or more transmission channels located in a well defined transmission band, for example, the so-called C band located between 1525-1565 nm.

Gain stage 202 may be any type of optical amplifier gain stage known in the art, such as an EDFA gain stage, a semiconductor optical amplifier (SOA) gain stage, or a lumped (discrete) Raman amplifier gain stage. In addition, gain stage 202 may include more than one sub-stage (not shown), each of which may be any type of lumped optical amplifier gain stage, as well as various components between the sub-stages, such as Variable Optical Attenuators (VOAs) and Gain Flattening Filters (GFFs). A mid-stage access (not shown) may also be provided between the various sub-stages of gain stage 202 for the purpose of connecting external devices such as Dispersion Compensation Modules (DCMs), and Optical Add Drop Multiplexer (OADM) modules. The use of such gain sub-stages and various subcomponents in an optical amplifier gain stage is well known in the art.

As amplified signal 206 propagates along a transmission fiber span 209 connected to output port 208, it creates spontaneous scattering due to the Raman scattering effect, part of which is directed back towards output port 208. This spontaneous scattering is amplified as it propagates along the transmission span due to the Raman effect, thus creating a Raman ASS 210 that enters output port 208 from transmission span 209. In addition to Raman ASS 210, a back-scattered signal 212, created due to Rayleigh back-scattering or back-scattering from discrete points such as splices and connectors along transmission line 209 may also enter input port 208 from the transmission span, Raman ASS 210 and back-scattered signal 212 enter a continuous out-of-band ASS monitoring unit 214, which is designed to separate and monitor a specific portion of the Raman ASS spectrum which is outside the transmission band of the signal. The electrical output of monitoring unit 214 is read by a control unit 216, which also controls gain stage 202 (the dotted arrows between control unit 216 and gain stage 202 and monitoring unit 214 signify electrical connections). Specifically, control unit 216 can instruct gain stage 202 to shut-down or to reduce the power of amplified signal 206. This control unit is similar to control unit 208 in FIG. 2a of U.S. Pat. No. 7,116,471, having similar operation and performing similar functions, with the main difference being that it controls gain-stage 202, rather than a pump unit.

Figure 2A:
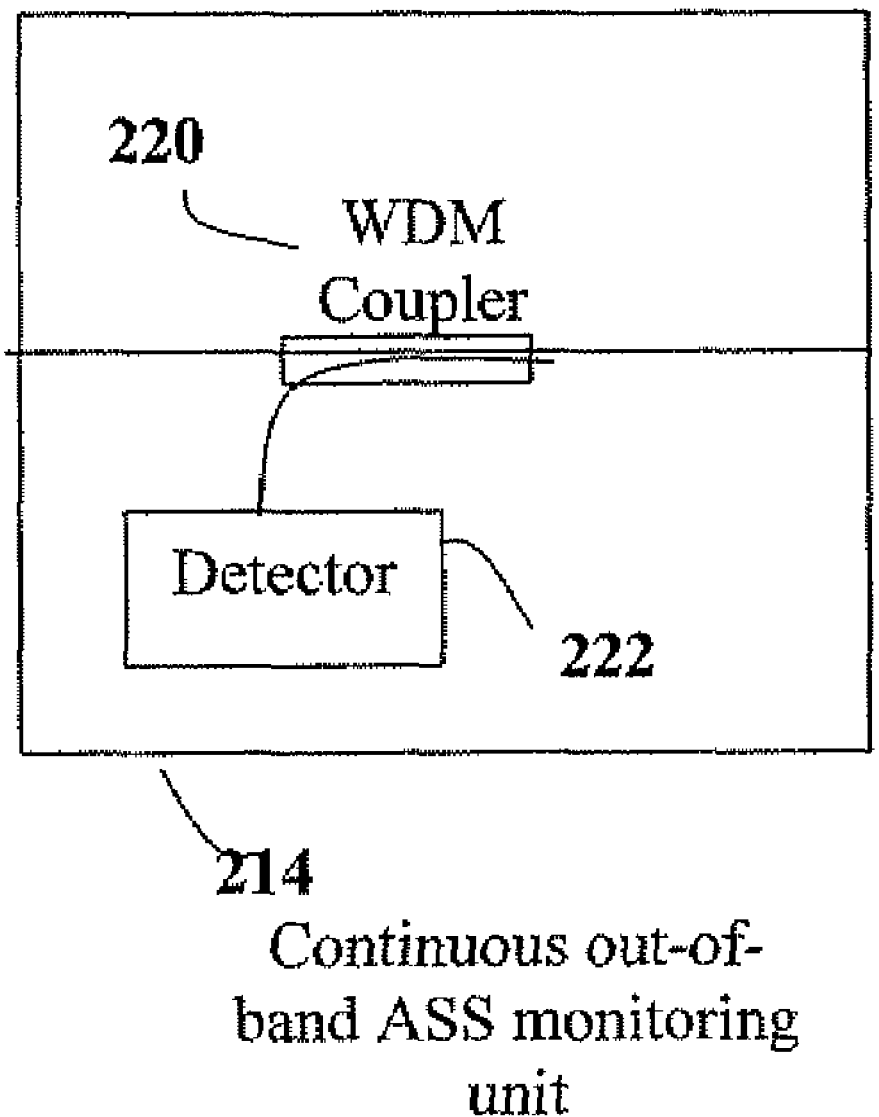
FIG. 2a shows one implementation of the continuous out-of-band ASS Monitoring Unit of FIG. 2.

In particular, unit 208 in FIG. 2a of U.S. Pat. No. 7,116,471 includes a detection and analysis function (209) to detect and analyze in real-time changes in the out-of-band ASS power level, an open span determining function (210) to determine whether the change in out-of-band ASS power level indicates an open span, and a safety function (211) activated when the open span is determined, to effect a reduction of the Raman pump energy entering the span. The control unit optionally further includes an open span characteristics determining function (212) operative to determine the approximate position of the opening in the open span based on the magnitude of change in the out-of-hand ASS power level. The control unit optionally further includes a span degradation function (213) operative to detect degradation in the span before the degradation develops into an open span. In the present invention, a control unit 216 would include similar functions, except that the safety function is activated to effect a reduction in the power of the amplified signal or shut-down of the gain stage.

Exemplarily, if the WDM transmission signal 203 is within the C-Band, then the Raman ASS spectrum will typically extend from the beginning of the C-Band, up to and beyond 1700 nm, although the majority of the Raman ASS energy will be in the spectral range between about 1580 to about 1680 nm, depending on the exact spectral composition of WDM transmission signal 203. In order to separate the Raman ASS from the back-scattered signal, monitoring unit 214 is designed to separate part of the wavelength band extending from the end of the C-Band (1565 nm) onwards. One attractive option is to separate out the wavelength band 1570 -1610 nm, which corresponds to the so-called L-Band and for which there are many commercially available and cost-effective filters specifically designed for this wavelength range. Another attractive option is to separate out the 1600-1650 nm band, which corresponds to the wavelength band used by many Optical Time Domain Reflectometer (OTDR) devices, and for which there are also many commercially available and cost-effective filters. As a general rule, the wavelength band selected by monitoring unit 214 should start beyond the end (i.e. high wavelength range) of the signal band, and be as large as possible in order to increase the sensitivity of the monitoring.

FIG. 2a shows one possible implementation of monitoring unit 214. A WDM coupler 220 is designed to select a specific wavelength range that is separate from the C-Band, and direct the energy within this wavelength range towards a detector 222, which monitors the level of this energy continuously. In the examples given above, the wavelength band may be the 1570-1610 nm band (L-Band) or the 1600-1650 nm band. One advantage of this implementation is that the Raman ASS to be detected is minimally attenuated (typically less than 1 dB) between output port 208 and detector 222, thus increasing the sensitivity of the monitoring and detection mechanism.

Figure 2B:
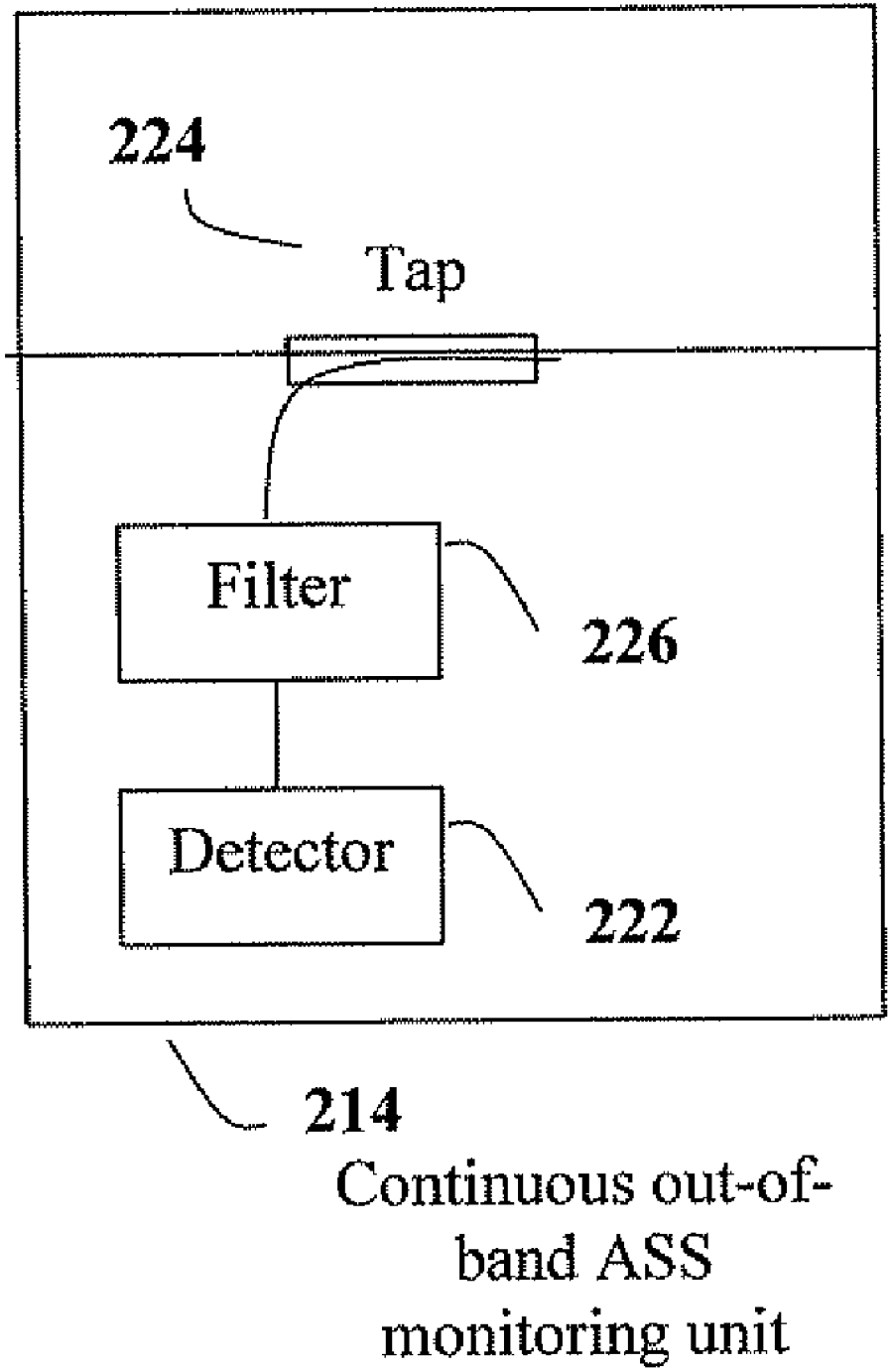
FIG. 2b shows another implementation of the continuous out-of-band ASS Monitoring Unit of FIG. 2.

FIG. 2b shows another possible implementation of monitoring unit 214. In this implantation, a tap 224 directs a small fraction (typically 1-4%) of the total energy entering port 208 from the transmission span towards a filter 226, which is designed to select out the desired wavelength range (1570-1610 nm, or 1600-1650 nm in the above examples), and direct the energy within this wavelength range to detector 222. One advantage of this implementation is that tap 224 introduces negligible attenuation (typically <0.3 dB) on the amplified signal 206 as it propagates from gain stage 202 to output port 208, thus increasing the total output power available from amplifier unit 200.

Filter 222 and WDM coupler 220 may be of any type commonly known in the art of optical amplifiers and communications. They can for example be based on thin film technology, Bragg grating technology, or fused fiber coupler technology.

In operation, monitoring unit 214 continuously detects the level of Raman ASS 210 entering output port 208, and the result is passed to control unit 216. Control unit 216 is designed to detect changes in the Raman ASS, and upon detection of such changes, as shown below, determines that an open span has occurred in the transmission span connected to output port 208. In such an event, control unit 216 sends a signal to gain stage 202 to shut down or to reduce the power of amplified signal 206 to a safe level (e.g. below 21 dBm for class 1M laser safety for signals in the C-Band or L-Band). Preferably, the time elapsed between the occurrence of the open span and the shut-down of gain stage 202 or the reduction of the amplified signal power 206 is shorter than the eye-safe time. For example, if the power of amplified signal 206 is below 500 mW (before occurrence of the open span event) and assuming the signal is in the C-Band, the elapsed time may be up to 1 s without causing any safety hazard.

Figure 3:
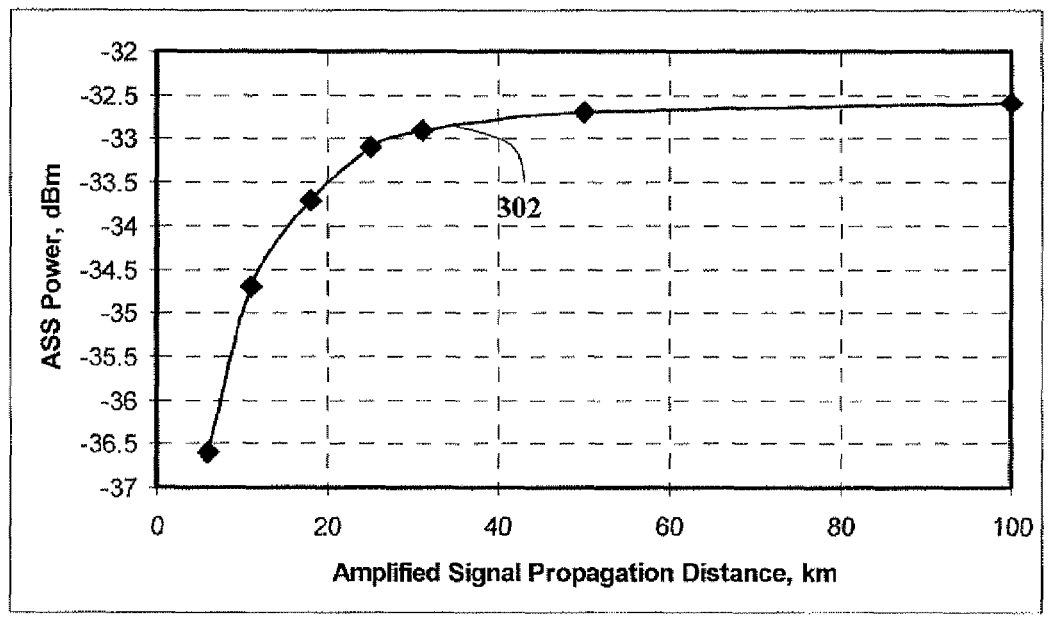
FIG. 3 shows an exemplary graph of the detected power level of ASS in the 1600-1650 nm wavelength band entering the lumped amplifier from the transmission span connected to the output port of the amplifier, as a function of the propagation distance of the amplified signal along the span;.
Figure 5:
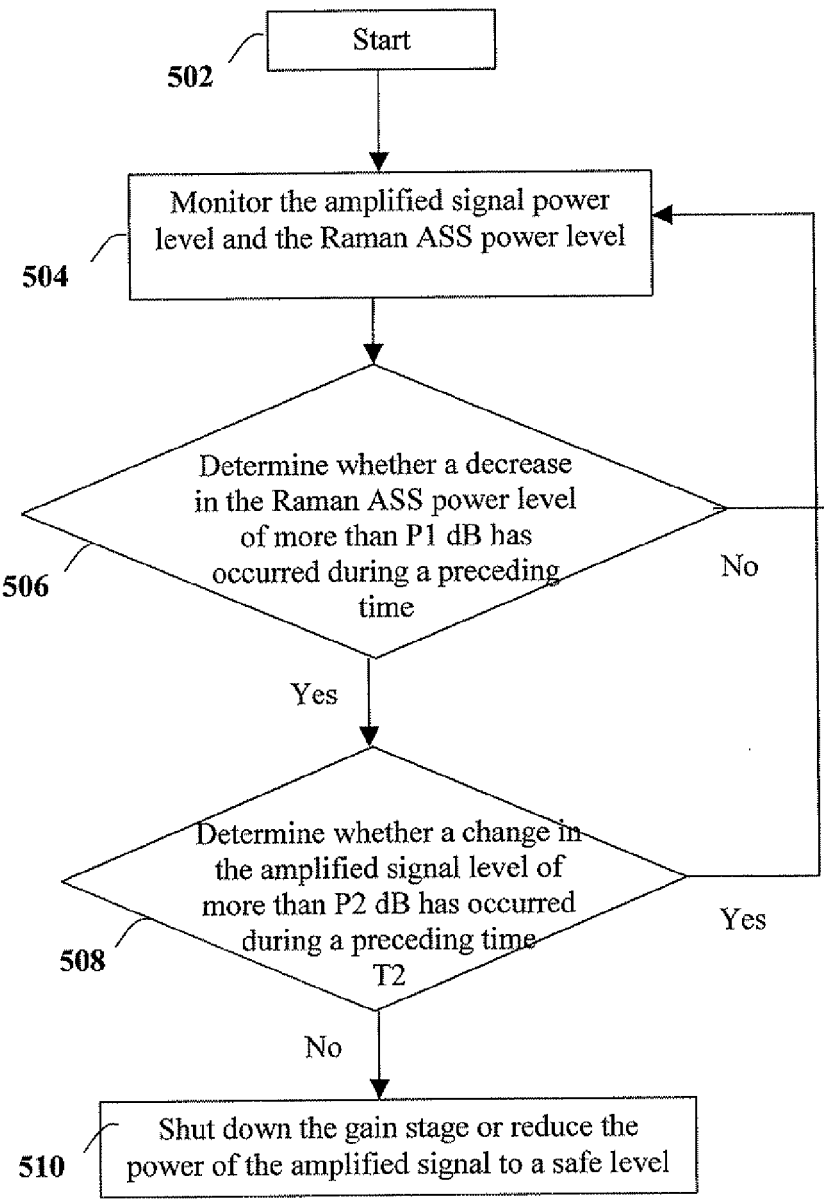
FIG. 5 shows a flow chart for detecting an open span used in conjunction with the lumped fiber amplifier shown in FIG. 4.

We now turn to FIG. 3, which is analogous to FIG. 5 of U.S. Pat. No. 7,116,471, with the main difference being that the Raman ASS is generated by amplified signal power instead of Raman pump power. Curve 302 shows the measured level of Raman ASS in the wavelength band 1600-1650 nm entering port 208, as a function of the distance from output port 208 of an open span occurring along the transmission span connected to the output port. The measurement was taken for the case where amplified signal 206 consisted of 16 WDM channels spaced evenly throughout the C-Band, with a total power of 20 dBm. The transmission span connected to output port 208 consisted of a standard Single Mode Fiber (SMF) also known as G.652 fiber. When there is no open span occurring along the span, or when the opening is far away from the output port (above about 50 km for this case), then the level of Raman ASS saturates, in this example to about −32.5 dBm. However, when an open span occurs closer to the output port, then the level of Raman ASS is less than the saturated level. In the current example, the Raman ASS level for an open span that occurred about 25 km from the output port was more than 0.4 dB below the saturated level.

Now assume that at a given moment an open span located within 25 km of the output port occurs. Based on the discussion above, the level of measured Raman ASS will suddenly decrease from the saturated value to a value that is at least 0.4 dB lower than the saturated value. Such a decrease is easily detected over and above any noise or normal fluctuations occurring in the system, so that the occurrence of the open span can be determined by control unit 216. In order to make the detection mechanism more robust and less prone to error, the decrease in Raman ASS has to occur within a given short time span. This time span should be selected to be long enough compared to typical time scales of an open span event, but short enough to preclude longer term naturally occurring fluctuations, such as those due to polarization effects. Furthermore, the selected time span should be shorter than the eye-safe time discussed above. For example, a time span of about 0.1 s will on the one hand be longer than the time scale of a typical open span event, but on the other hand will be significantly shorter than the time scale of polarization or temperature induced fluctuations (usually of the order of seconds). Also, such a time span is much shorter than the eye-safe time, typically 1 s as discussed above.

Figure 6:
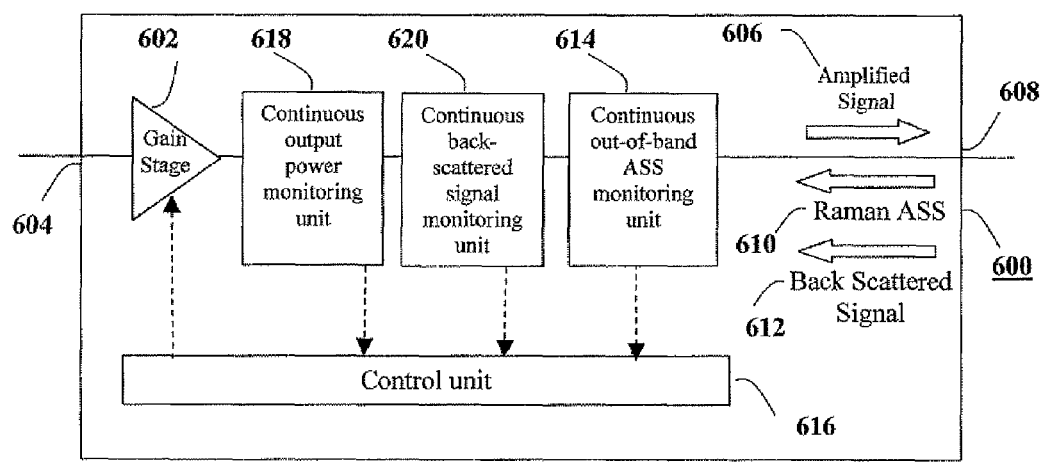
FIG. 6 shows a lumped optical amplifier unit according to yet another embodiment of the present invention.

The method by which the control unit determines the open span is similar to that shown in FIG. 6 of U.S. Pat. No. 7,116,471 and its associated description. It has been shown that an open span occurring at least up to 25 km from the output port can be detected using the above described method. In fact, since the signal level is naturally attenuated as it propagates along the fiber, and eventually decreases to a safe level, it is only necessary from a safety point of view to detect an open span within that section of the transmission span where the signal power is higher than the safe level. In many cases of practical interest this section does not extend beyond 25 km of the output port, so that by employing the described method control unit 216 can detect any open span in the transmission span that poses a safety hazard.

Figure 3A:
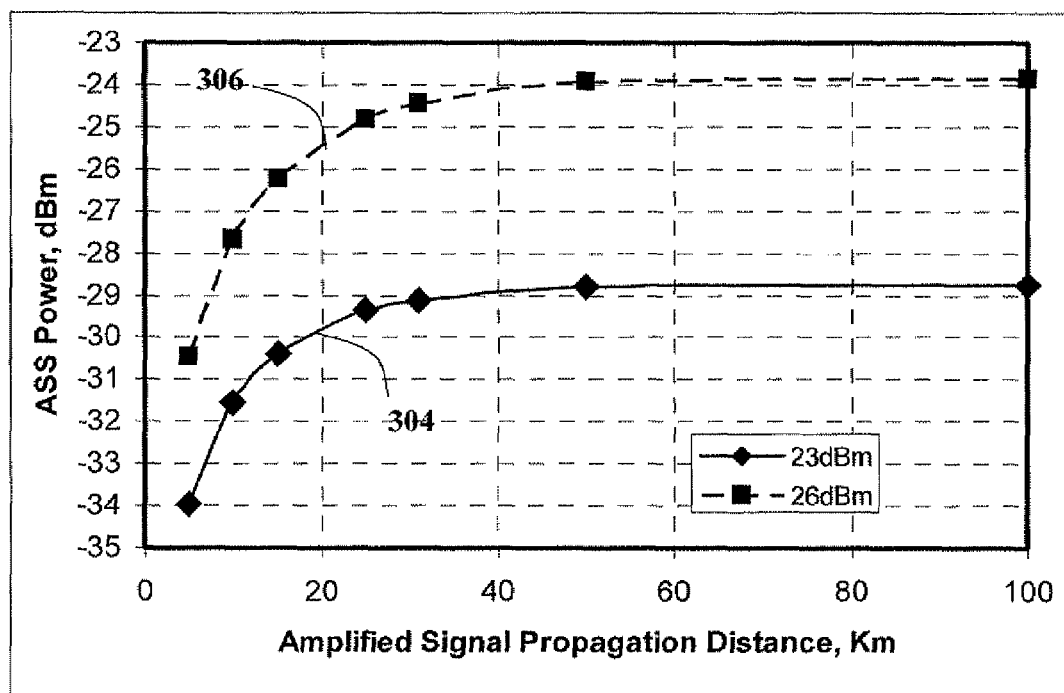
FIG. 3a shows another exemplary graph of the detected power level of ASS in the 1600-1650 nm wavelength band entering the lumped amplifier from the transmission span connected to the output port of the amplifier, as a function of the propagation distance of the amplified signal along the span.

The example shown in FIG. 3 corresponds to a total amplified signal power of about +20 dBm propagating over a 0.652 transmission fiber. Since the Raman ASS is higher for a higher amplifier signal power, this can be considered the worst case with respect to the sensitivity of the detection mechanism. In fact, amplified signal powers of +20 dBm are considered class 1 M with respect to laser safety (assuming the signal is in the C-Band or L-Band), and thus it is not mandatory to detect an open span for such low amplified signal power levels. For amplified signal levels higher than +20 dBm, the Raman ASS will be higher, which will make it even easier to detect open spans. This is illustrated by the graph shown in FIG. 3a, where curves 304 and 306 are similar to curve 302 of FIG. 3, except that the total power of amplified signal 206 is 23 dBm and 26 dBm respectively. As seen from the comparison of the curves of FIG. 3 and FIG. 3a, while the level of measured Raman ASS is different in each case, the overall shape of the curves is similar, Furthermore, the magnitude of the decrease of the Raman ASS relative to the saturated level for an open span occurring at a given distance increases as the amplified signal power increases. Thus, for an amplified signal level of +26 dBm, a decrease of 0.4 dB occurs at a distance greater than 25 km, making it possible to detect open spans occurring farther away from output port 208. This has important practical implications, since the higher the amplified signal power, the longer the propagation distance that is required before the signal is attenuated to a safe level, and thus the longer the distance for which it is necessary to detect an open span.

Figure 3B:
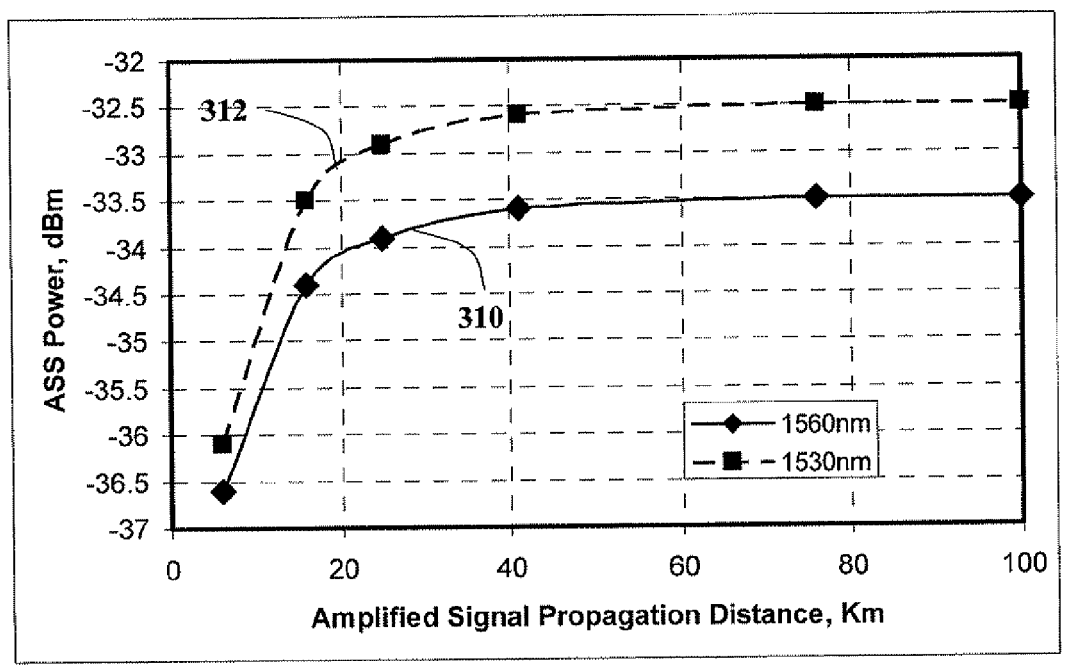
FIG. 3b shows yet another exemplary graph of the detected power level of ASS in the 1600-1650 nm wavelength band entering the lumped amplifier from the transmission span connected to the output port of the amplifier, as a function of the propagation distance of the amplified signal along the span.

As discussed previously, another issue that has to be accounted for is that the spectral composition of the signal entering amplifier input port 204, and correspondingly the spectral composition of amplified signal 206 exiting port 208, is unknown and uncontrolled by the amplifier unit. To this end, FIG. 3b shows graphs similar to FIG. 3, except that curve 310 corresponds to the case where amplified signal 206 includes a single channel at wavelength 1530 nm (i.e. at the blue end of the C-Band), whereas curve 312 corresponds to the case where amplified signal 206 comprises a single channel at wavelength 1560 nm (i.e. at the red end of the C-Band). In both cases, the total power of amplified signal 206 is 20 dBm, as in FIG. 2. Thus, taken together, curves 302, 310 and 312 represent three extreme cases in which amplified signal 206 is either distributed evenly throughout the C-Band, totally concentrated at one end of the C-Band, or totally concentrated at the other end of the C-band As seen from the comparison of the three curves, while the level of measured Raman ASS is different in each case, the overall shape of the curves is similar. In particular, the magnitude of the decrease in Raman ASS level when an open span occurs within 25 km of output port 208 is at least 0.4 dB.

Similarly, for other types of transmission fiber, the Raman ASS level will be different (typically higher), but again the magnitude of the decrease when an open span occurs will be at least the same as for the SMF fiber. Furthermore, while FIG. 3 corresponds to a Raman ASS power measured in the 1600-1650 nm band, the same shape of curve 302 will apply for other bands. In particular, the magnitude of the decrease in Raman ASS level when an open span occurs within the first 25 km will be at least 0.4 dB.

Figure 4:
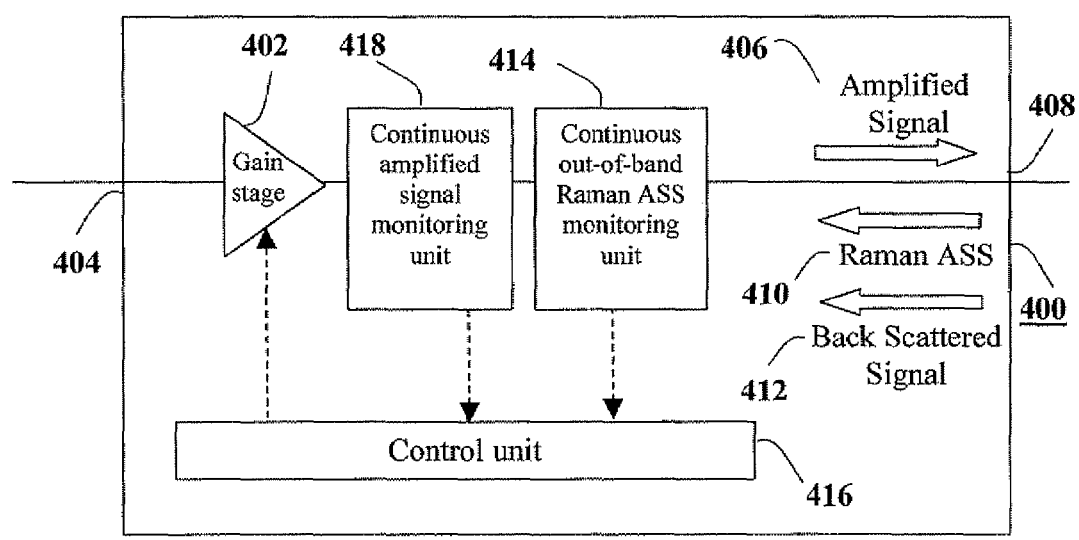
FIG. 4 shows a lumped optical amplifier unit according to yet another embodiment of the present invention.

To take into account possible changes in the power level of the amplified signal, it is necessary to continuously monitor this power level. In fact, in almost all practical cases gain stage 202 will already include a mechanism necessary to continuously monitor the power level of the amplifier signal, as such a mechanism is necessary for the control and stable functioning of the gain stage. FIG. 4 shows an amplifier unit 400 similar to amplifier unit 200 of FIG. 2, except for an explicitly shown continuous amplified signal monitoring unit 418. It should be understood that such a unit can be, and in most cases typically is, included within gain stage 402. Elements 402 through 416 are identical to the corresponding elements 202 to 216 of FIG. 2. The purpose of unit 418 is to continuously monitor the amplified signal power level exiting gain stage 402. This unit typically consists of a tap, which directs 1-4% of the amplified signal power to a detector. The electrical output of this detector is fed to the control unit, thus allowing the control unit to detect changes in the level of the amplified signal.

We turn now to FIG. 5, which shows an exemplary flow chart describing the process by which control unit 416 utilizes the additional information provided by amplified signal monitoring unit 418, in order to improve the open span detection mechanism. The process begins with step 502, which is initiated when gain stage 402 is powered on, or when the power of amplified signal 406 increases above a level which is considered safe (for example, about 21 dBm corresponding to the maximum allowed level for class 1 M safety classification of C-Band or L-Band signals). In step 504, both the power level of the amplified signal and that of the Raman ASS are monitored. In step 506, a check determines whether a decrease of more than P1 dB has occurred in the power level of the Raman ASS over a preceding time period T1. Based on the discussion in relation to FIG. 3, P1 may exemplarily be 0.4 dB, and T1 may exemplarily be 0.1 s. If such a decrease has not occurred, the process returns to step 504. If such a decrease has not occurred, then in step 508 a further check determines whether a change of more than P2 dB has occurred in the level of the amplified signal over a preceding time period T2. P2 is selected to be large enough to rule out random variations of the amplified signal power and small enough to account for a relatively small change in the amplified signal composition (e.g. a drop of 1 channel out of 10). Typically, P2 will be set equal or similar to the value of P1. The time T2 is determined according to the length of the delay between a change in the amplified signal power and the resulting change in Raman ASS power level. This delay arises because the Raman ASS is created along the transmission fiber, and therefore the amplified signal has to travel some distance along the transmission fiber to where the Raman ASS is created, and the Raman ASS has to travel back to the amplifier unit. Since most of the Raman ASS is typically created in the first 20-30 km of fiber, the delay is typically less than 0.5 ms. Thus, to make sure that a detected change in Raman ASS is not due to a change in amplified signal power, it is necessary to set T3 to preferably at least 0.5 ms. However, lower values of T3 are possible in some scenarios.

Thus, the method described in the flow chart of FIG. 5 allows the control unit to determine whether a detected change in the Raman ASS level was due to a corresponding change in the amplified signal level or due to an open span. Only in the latter case will the control unit instruct the gain stage to shut-down or to reduce the power of the amplified signal to a safe level. It should be emphasized that exact details of the flow chart of FIG. 5 can change, as long as the overall goal as just stated is maintained.

FIG. 6 is similar to FIG. 4, with the addition of a continuous back-scattered signal monitoring unit 620, used to detect the back-scattered signal. Elements 602 through 616 are identical to the corresponding elements 402 to 416 of FIG. 4. Unit 620 can provide additional safety and functionality when the open span is due to a PC connector. In such a case, the level of back-scattered signal will increase significantly (relative to the case when there is no open connector) and this increase can be used to determine an open span, and thus provide additional backup to the mechanism based on Raman ASS described above. For example, if there is no open span along the line, the back-scattered signal will typically be only due to Rayleigh backscattering, and thus be at a level approximately 30 dB lower than the level of the amplified signal at an output port 608. If a PC connector is now opened very near to output port 608, then the level of the back-scattered signal will increase to approximately 14 dB below the level of the amplified signal at output port 608. If a PC connector is opened further away from output port 608, then the increase will be lower but still detectable. In practice, an open PC connector up to about 30 km from output port 608 will cause a detectable increase of the power of the back-scattered signal by about 0.5 dB above the level when there is no open connector (i.e. the level due to Rayleigh back-scattering).

Figure 7:
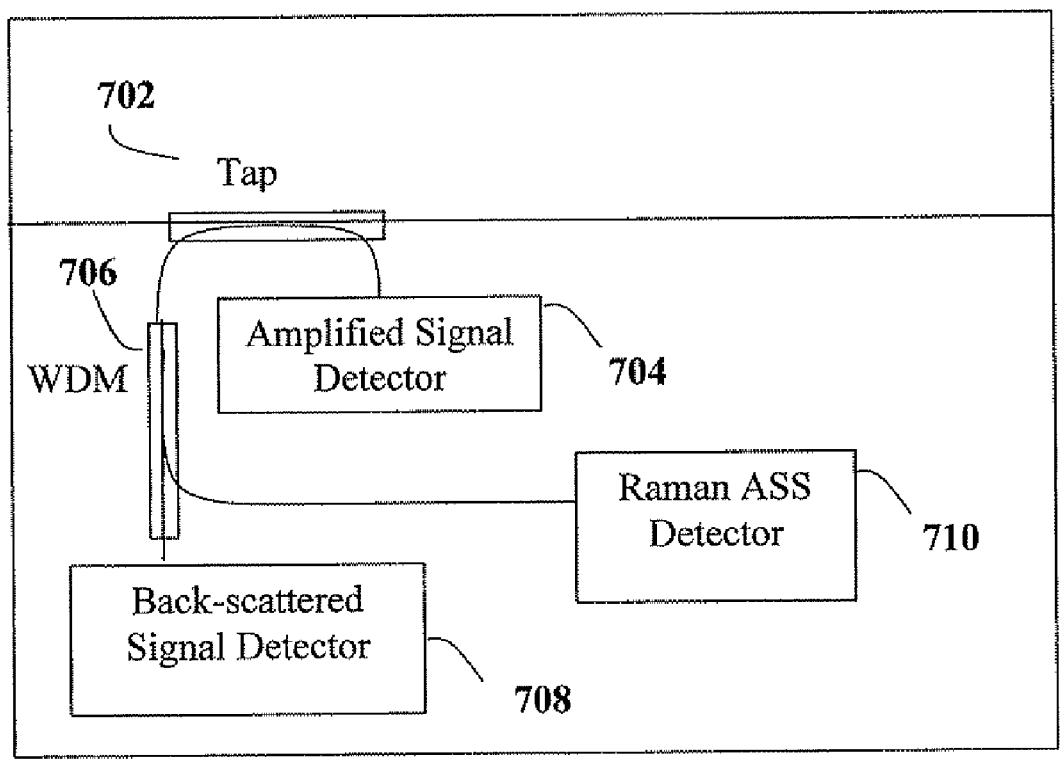
FIG. 7 shows one implementation of the continuous output power monitoring unit, continuous back-scattered signal monitoring unit, and continuous out-of-band ASS monitoring unit of FIG. 6.

FIG. 7 shows an exemplary implementation of monitoring units 614, 618 and 620 of FIG. 6. In this embodiment, a Tap 702 directs a small fraction (typically 1-4%) of the amplified signal coming from gain stage 602 (FIG. 6) to an amplified signal detector 704. Tap 702 also directs the same fraction of the total power coming from output port 608 (FIG. 6) to a WDM 706. WDM 706 separates the back-scattered signal band (e.g. the C-Band) from the Raman ASS band (e.g. 1600-1650 nm), and directs the former to a backscattered signal detector 708, and the latter to a Raman ASS detector 710.

Figure 8:
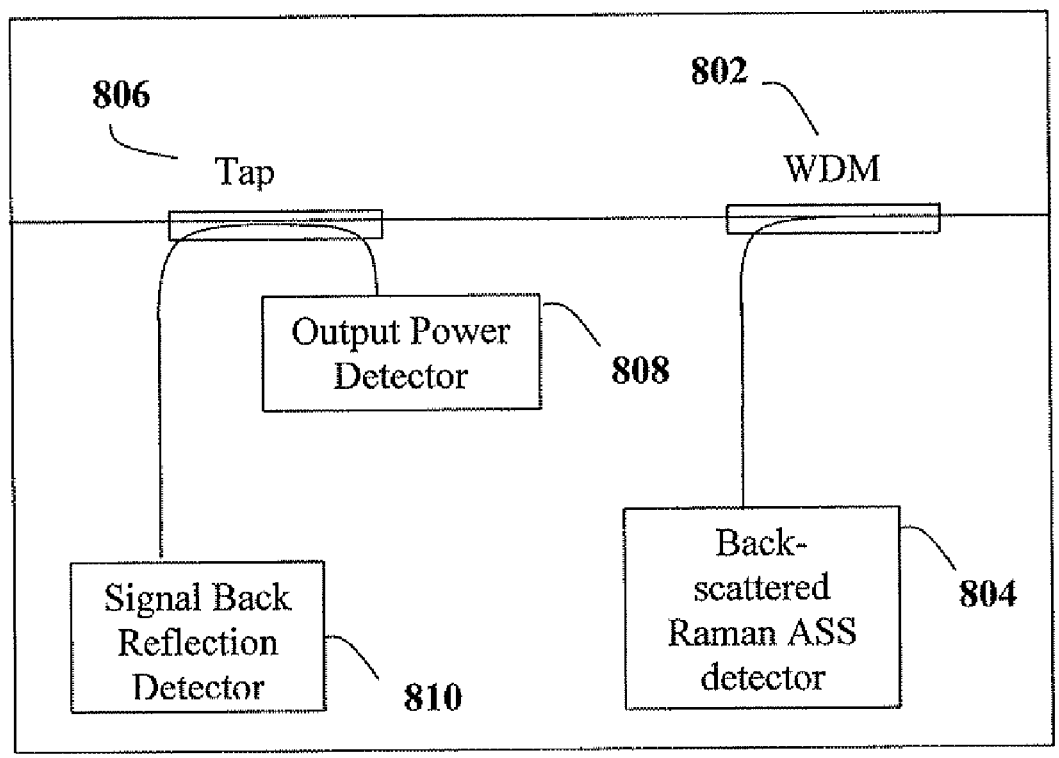
FIG. 8 shows another implementation of the continuous output power monitoring unit, continuous back-scattered signal monitoring unit, and continuous out-of-band ASS monitoring unit of FIG. 6.

FIG. 8 shows another exemplary implementation of the monitoring units 614, 618 and 620 of FIG. 6. In this embodiment a WDM 802 separates out the Raman ASS band from the energy coming from output port 608 (FIG. 6) and directs this separated band to a Raman ASS detector 804. In addition, a Tap 806 directs a small fraction (typically 1-4%) of the amplified signal coming from gain stage 602 (FIG. 6) to an amplified signal detector 808. Tap 806 also directs the same fraction of the backscattered signal (separated from the Raman ASS by WDM 802) to a backscattered signal detector 810.

All publications, patents and patent applications mentioned in this specification are herein incorporated in their entirety by reference into the specification, to the same extent as if each individual publication, patent or patent application was specifically and individually indicated to be incorporated herein by reference, In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. In an optical communication system, a lumped optical amplifier for enhancing eye-protection during amplifier operation comprising:
    a. a gain stage for amplifying an optical WDM transmission signal within a predetermined wavelength band to create an amplified signal that exits an amplifier output port into an optical communication network span, wherein the amplified signal produces Raman amplified spontaneous scattering (ASS) directed back into the amplifier from the span;
    b. an out-of-band Raman ASS monitoring unit for continuously measuring an out-of band power level of the Raman ASS entering the amplifier from the span; and
    c. a control unit configured for real time detection of a change in the out-of band Raman ASS power level and for performing an action selected from the group consisting of reducing the power of the amplified signal and shutting down the gain stage, in response to the real time detection.

2. The lumped optical amplifier of claim 1, wherein the control unit includes:
    i) a detection and analysis function to detect and analyze in real-time the change in out-of-band Raman ASS power level,
    ii) an open span determining function to determine whether the change in out-of-band Raman ASS power level indicates an open span, and
    iii) a safety function activated when the open span is determined, to effect the reduction in the power of the amplified signal or the shut-down of the gain stage.

3. The lumped optical amplifier of claim 1, wherein the out of band Raman ASS monitoring unit includes
    i. a WDM coupler for selecting a specific wavelength range separate from the predetermined wavelength band, and
    ii. a detector to monitor continuously energy within the specific wavelength range.

4. The lumped optical amplifier of claim 1, wherein the out of band Raman ASS monitoring unit includes:
    i. a tap for directing a fraction of the total energy entering the output port from the transmission span,
    ii. a filter for selecting a specific wavelength range for monitoring the Raman ASS separate from the predetermined wavelength band, and
    iii. a detector for monitoring continuously energy within the selected wavelength range.

5. The lumped optical amplifier of claim 2, wherein the control unit is operative such that the time elapsed between the occurrence of the open span and the activation of the safety function is shorter than an eye-safe time.

6. The lumped optical amplifier of claim 2, wherein the control unit further includes an open span characteristics determining function, operative to determine the approximate position of an opening in the open span based on the magnitude of the change in the out-of-band Raman ASS power level.

7. The lumped optical amplifier of claim of claim 6, wherein the control unit further includes a span degradation function operative to detect degradation in the span before the degradation develops into the open span.

8. The lumped optical amplifier of claim of claim 1, wherein the predetermined wavelength band is the C-band, and wherein the monitoring unit is designed to select a wavelength band from the wavelength range extending from a high wavelength end of the C-band toward higher wavelengths.

9. The lumped optical amplifier of claim 8, wherein the specific wavelength band is selected from the group consisting of a 1570 nm to 1610 nm band and a 1600 nm to 1650 nm band.

10. In an optical communication system, a lumped optical amplifier for enhancing eye-protection during amplifier operation, comprising:
    a. a gain stage for amplifying an optical WDM transmission signal within a predetermined wavelength band to create an amplified signal that exits the amplifier output port into an optical communication network span, wherein the amplified signal produces Raman amplified spontaneous scattering (ASS) directed back into the amplifier from the span;
    b. an out-of-band Raman ASS monitoring unit for continuously measuring an out-of-band power level of the Raman ASS entering the amplifier from the span;
    c. an amplified signal monitoring unit for continuously measuring a power level of the amplified signal; and
    d. a control unit configured for real time detection of a change in the out-of-band Raman ASS power level and verification that this change is not associated with a change in the amplified signal level, and for performing an action selected from the group consisting of reducing the power of the amplified signal and shutting down the gain stage, in response to the real time detection.

11. The lumped optical amplifier of claim 10, wherein the control unit includes:
    i) a detection and analysis function to detect and analyze in real-time the change in out-of-band Raman ASS power level,
    ii) an open span determining function to determine whether the change in out-of-band Raman ASS power level indicates an open span, and
    iii) a safety function activated when the open span is determined, to effect the reduction in the power of the amplified signal or the shut-down of the gain stage.

12. The lumped optical amplifier of claim 11, wherein the control unit farther includes an open span characteristics determining function, operative to determine the approximate position of the opening in the open span based on the magnitude of the change in the out-of-band Raman ASS power level.

13. The lumped optical amplifier of claim 12, wherein the control unit further includes a span degradation function operative to detect degradation in the span before the degradation develops into the open span.

14. The lumped optical amplifier of claim 10, wherein the predetermined wavelength band is the C-band, and wherein the monitoring unit is designed to select a wavelength band from the wavelength range extending from a high wavelength end of the C-band toward higher wavelengths.

15. A method for enhancing eye-protection during a lumped optical amplifier operation in a communication system, comprising the steps of:
   a. in the lumped optical amplifier, amplifying an input signal of a predetermined wavelength band into an amplified signal transmitted through an output port of the amplifier to a communication network span;
   b. continuously monitoring an out-of-band power level of Raman ASS created by the amplified signal within the communication network span;
   c. detecting in real-time when a change in the out-of-band Raman ASS power level signifies an open span; and
   d. responsive to a result of the real-time detecting, performing an action selected from the group of reducing the power of the amplified signal and shutting down a gain stage of the amplifier, thereby obtaining enhanced eye-safety.

16. The method of claim 15, wherein the step of reducing the power of the amplified signal or shutting down a gain stage of the amplifier is effected faster than an eye-safe time.

17. The method of claim 15, further including the step of determining an approximate position of an opening in the open span, based on a magnitude of the change in the out-of-band Raman ASS power level.

18. In an optical communication system, a method for enhancing eye-protection during a lumped optical amplifier operation in a communication system, comprising the steps of:
   a. in the lumped optical amplifier, obtaining an out-of-band Raman ASS power level related to an amplified signal transmitted through an output port of the amplifier to a communication network span;
   b. monitoring the power level of the amplified signal and the out-of-band Raman ASS created by the amplified signal;
   c. determining whether the Raman ASS power level has decreased by more than a value P1 during a preceding time period T1, and if yes;
   d. determining whether the amplified signal level has changed by more than a value P2 during a preceding time period T2, and if no;
   e. performing an action to ensure that no safety hazard is caused due to an open span in the span connected to the output port of the amplifier.

19. The method of claim 18, wherein the step of performing an action to ensure that no safety hazard occurs includes performing an action selected from the group consisting of shutting down a gain stage of the amplifier and reducing an amplified signal power to a safe level.

20. The method of claim 18, further including the step of determining an approximate position of an opening in the open span, based on a magnitude of the change in the out-of-band Raman ASS power level.

* * * * *

UNITED STATES PATENT AND TRADEMARK OFFICE
CERTIFICATE OF CORRECTION

PATENT NO. : 7,440,177 B2 Page 1 of 1
APPLICATION NO. : 11/692970
DATED : October 21, 2008
INVENTOR(S) : Uri Ghera, Alex Shlifer and David Menashe It is certified that error appears in the above-identified patent and that said Letters Patent is hereby corrected as shown below:

Front page

Assignee (73) should be corrected as follows:
change
-- EDC Optical Networks Inc. --
to
"REDC Optical Networks Inc."

Signed and Sealed this

Twenty-third Day of December, 2008

JON W. DUDAS
*Director of the United States Patent and Trademark Office*